US012619066B2

(12) United States Patent
Peng et al.

(10) Patent No.: US 12,619,066 B2
(45) Date of Patent: May 5, 2026

(54) DRIVING MECHANISM

(71) Applicant: Actutek Corporation, Taoyuan City (TW)

(72) Inventors: Chun-Chia Peng, Taoyuan City (TW); Po-Xiang Zhuang, Taoyuan City (TW); Wei-Jhe Shen, Taoyuan City (TW); Yi-Ho Chen, Taoyuan City (TW); Ko-Lun Chao, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 136 days.

(21) Appl. No.: 18/593,709

(22) Filed: Mar. 1, 2024

(65) Prior Publication Data

US 2024/0297560 A1    Sep. 5, 2024

Related U.S. Application Data

(60) Provisional application No. 63/449,410, filed on Mar. 2, 2023.

(51) Int. Cl.
| | |
|---|---|
| *H02K 41/03* | (2006.01) |
| *G02B 7/02* | (2021.01) |
| *G02B 26/08* | (2006.01) |
| *G02B 27/64* | (2006.01) |
| *G03B 13/36* | (2021.01) |
| *H02K 11/00* | (2016.01) |
| *H02K 11/33* | (2016.01) |
| *H02K 41/06* | (2006.01) |
| *H04N 23/55* | (2023.01) |
| *H04N 23/68* | (2023.01) |
| *G02B 7/10* | (2021.01) |
| *G03B 13/32* | (2021.01) |

(52) U.S. Cl.
CPC .............. *H02K 41/03* (2013.01); *G02B 7/02* (2013.01); *G02B 26/0875* (2013.01); *G02B 27/646* (2013.01); *G03B 13/36* (2013.01); *H02K 11/0094* (2013.01); *H02K 11/33* (2016.01); *H02K 41/06* (2013.01); *H04N 23/55* (2023.01); *H04N 23/685* (2023.01); *G02B 7/10* (2013.01); *G03B 13/32* (2013.01); *G03B 2205/003* (2013.01)

(58) Field of Classification Search
USPC ...................................................... 310/15–39
See application file for complete search history.

(56) References Cited

U.S. PATENT DOCUMENTS

| | | | |
|---|---|---|---|
| 2015/0002683 A1* | 1/2015 | Hu ........................ | G03B 17/17 |
| | | | 348/208.11 |
| 2017/0123180 A1* | 5/2017 | Osaka .................. | G02B 27/646 |
| 2018/0372988 A1* | 12/2018 | Hu ........................... | G02B 7/09 |
| 2019/0230262 A1* | 7/2019 | Wang ..................... | G09G 5/003 |

* cited by examiner

*Primary Examiner* — Oluseye Iwarere
*Assistant Examiner* — Minki Chang
(74) *Attorney, Agent, or Firm* — MUNCY, GEISSLER, OLDS & LOWE, P.C.

(57) ABSTRACT

A driving mechanism for moving an optical element is provided. The driving mechanism includes a fixed part, a movable part, and a driving assembly. The movable part is movably connected to the fixed part for holding the optical element. The driving assembly is configured for moving the movable part relative to the fixed part.

20 Claims, 8 Drawing Sheets

100

DRIVING MECHANISM

CROSS REFERENCE TO RELATED APPLICATIONS

This application claims the benefit of U.S. provisional application No. 63/449,410, filed Mar. 2, 2023, the entirety of which is incorporated by reference herein.

BACKGROUND OF THE INVENTION

Field of the Invention

The present invention relates to a driving mechanism, and, in particular, to a driving mechanism for moving an optical element.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

In some electronic devices, several coils and magnets are usually used for adjusting the focus of a lens. However, miniaturization of the electronic devices may increase the difficulty of mechanical design, and it may also lead to low reliability and a low positioning accuracy of the driving mechanism. Therefore, addressing the aforementioned problems has become a challenge.

BRIEF SUMMARY OF THE INVENTION

An embodiment of the present invention provides a driving mechanism for moving an optical element. The driving mechanism includes a fixed part, a movable part, and a driving assembly. The movable part is movably connected to the fixed part for holding the optical element. The driving assembly is configured for moving the movable part relative to the fixed part.

In some embodiments, the driving mechanism further includes a sensor, wherein the driving assembly includes a first driving element that drives the movable part to rotate relative to the fixed part around a first axis, the sensor and the first driving element are disposed on the fixed part, and when viewed in a reference direction, the first driving element and the sensor at least partially overlap.

In some embodiments, the driving assembly further includes a first magnetic element disposed on the movable part, and the sensor is a magnetic field sensor to detect the position variation of the first magnetic element.

In some embodiments, the first driving element includes a coil surrounding the sensor.

In some embodiments, the fixed part includes a base and a plate member connected to the base, and a cavity and a protrusion are formed on an inner surface of the plate member, wherein the first driving element is disposed on a bottom surface of the cavity, and the sensor is disposed on a top surface of the protrusion, wherein the bottom surface and the top surface are parallel to the reference direction, and the first driving element and the sensor do not protrude from the inner surface of the plate member.

In some embodiments, the driving assembly further includes a first magnetic element disposed on the movable part, and the sensor is a magnetic field sensor to detect the position variation of the first magnetic element and the movable part.

In some embodiments, the distance between the bottom surface of the cavity and the first magnetic element is longer than the distance between the top surface of the protrusion and the first magnetic element.

In some embodiments, the distance between the first driving element and the first magnetic element is shorter than the distance between the sensor and the first magnetic element.

In some embodiments, the first driving element includes a coil, and the cavity surrounds the protrusion.

In some embodiments, the driving assembly further includes a second driving element disposed on the fixed part for driving the movable part to rotate relative to the fixed part around the first axis, and the first and second driving elements are located on opposite sides of the movable part, wherein the first driving element and a central axis of the optical element have a first distance, and the second driving element and the central axis of the optical element have a second distance, wherein the first distance is shorter than the second distance.

In some embodiments, the driving mechanism further includes a rotary member and a ball pivotally connecting the rotary member to the movable part, wherein the optical element is disposed on the rotary member, and the rotary member is rotatable relative to the movable part around a second axis via the ball.

In some embodiments, the reference direction is perpendicular to the first and second axes.

In some embodiments, the driving mechanism further includes a hinge, a rotary member, and a ball, wherein movable part is pivotally connected to the fixed part via the hinge, the rotary member is pivotally connected to the movable part via the ball, and the optical element is disposed on the rotary member.

In some embodiments, the movable part is rotatable relative to the fixed part around a first axis, the fixed part forms a slot extending along the first axis, and the hinge is received in the slot, wherein the slot has a first section, a second section, and a third section, the second section is connected between the first and third sections, and the width of the second section is longer than the width of the first and third sections.

In some embodiments, the driving mechanism further includes a magnet disposed in the slot. In some embodiments, the driving mechanism further includes two balls disposed on opposite sides of the movable part, wherein the balls are connected between the rotary member and the movable part, and the hinge is located between the balls.

In some embodiments, the driving mechanism further includes a magnetic permeable element disposed on the movable part, wherein the driving assembly further includes a first magnetic element disposed on the movable part, and the ball is located between the magnetic permeable element and the first magnetic element.

In some embodiments, the rotary member is rotatable relative to the movable part around a second axis, and when viewed along the first axis or the second axis, the rotary member and the hinge do not overlap.

In some embodiments, the driving mechanism further includes two balls, wherein the rotary member has two sleeve portions, and the movable part forms two recesses, wherein the sleeve portions respectively extend in a first direction and a second direction, the recesses are recessed in a third direction that is parallel to the first axis, and the balls are received in the recesses and connected to the sleeve portions, wherein the first and second directions are opposite to each other and parallel to the second axis.

In some embodiments, the fixed part includes a base and a plate member connected to the base, and the base has a bottom portion, a first wall, and a second wall perpendicular to each other, wherein the plate member is connected to the bottom portion and the first wall, and the movable part is located between the plate member and the second wall.

In some embodiments, the driving assembly includes a first magnetic element, a second magnetic element, a first driving element, and a second driving element for driving the movable part to rotate relative to the fixed part around a first axis, wherein the first driving element is received in a cavity of the plate member, and the second driving element is received in an opening of the second wall, wherein the first and second magnetic elements are disposed on opposite sides of the movable part and located corresponding to the first and second driving elements.

In some embodiments, the distance between the first driving element and the first magnetic element is shorter than the distance between the second driving element and the second magnetic element.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
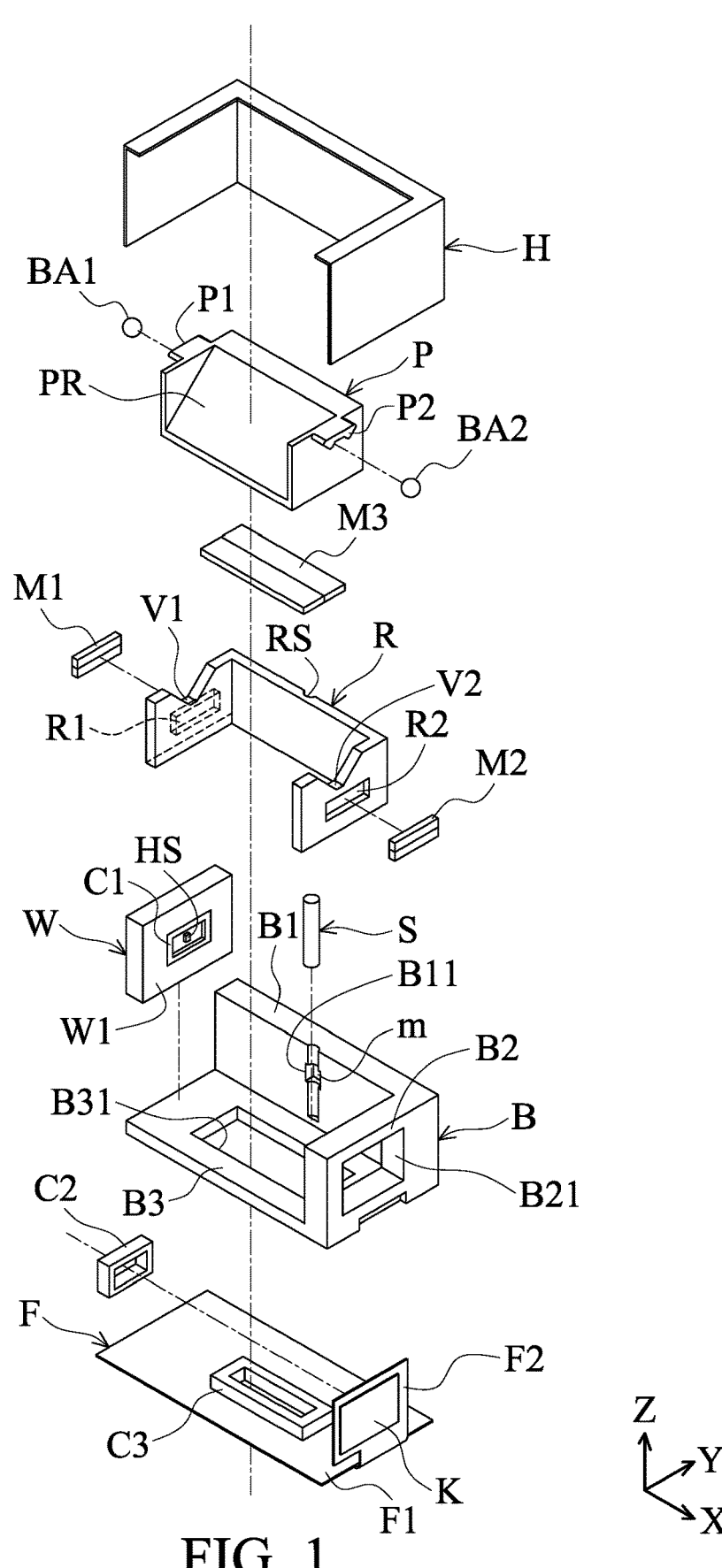
FIG. 1 shows an exploded view of a driving mechanism 100 in accordance with an embodiment of the invention.
Figure 2:
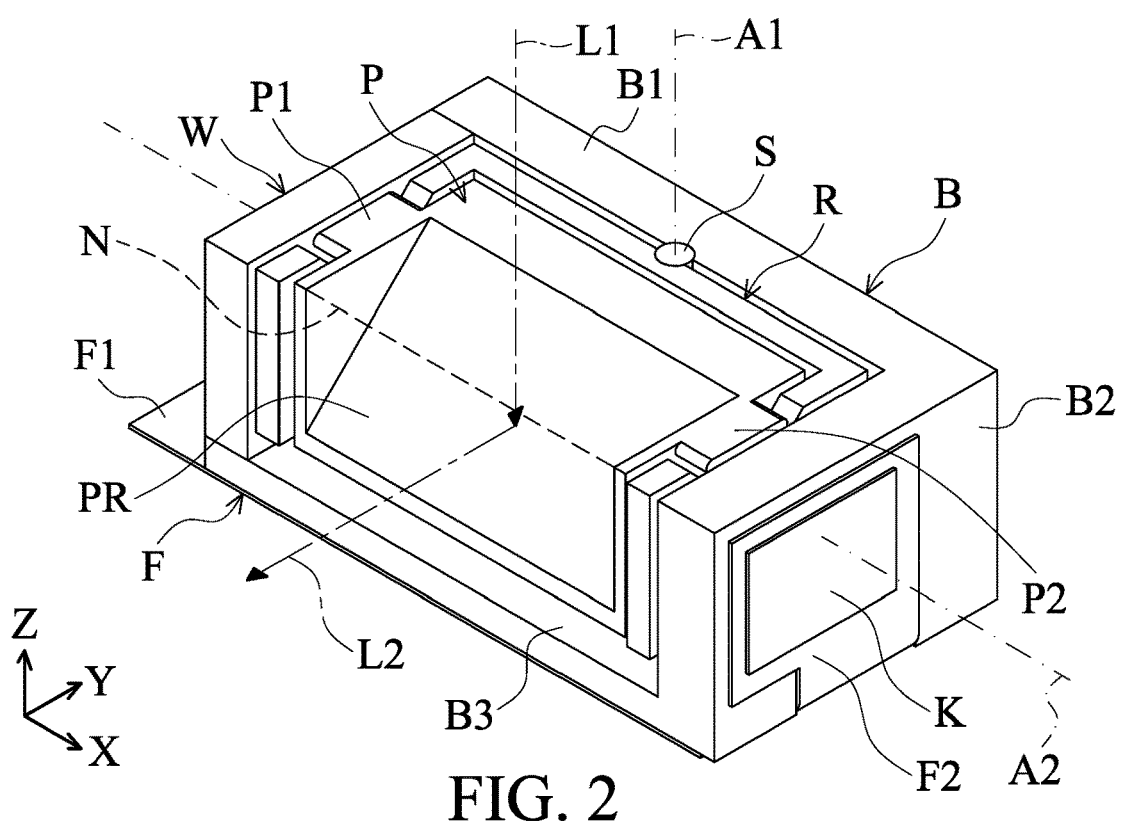
FIG. 2 shows a perspective diagram of the driving mechanism 100 in FIG. 1 with the housing H removed therefrom.
Figure 3:
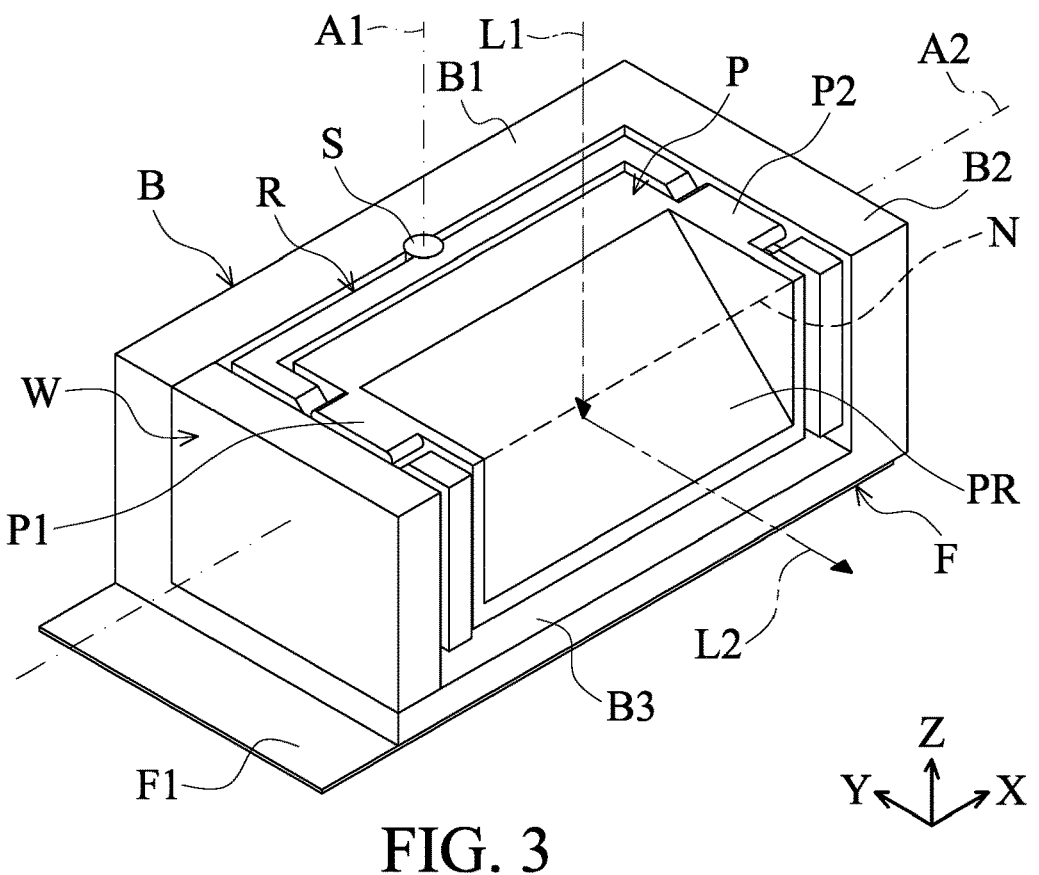
FIG. 3 shows another perspective diagram of the driving mechanism 100 in FIG. 1 with the housing H removed therefrom.
Figure 4:
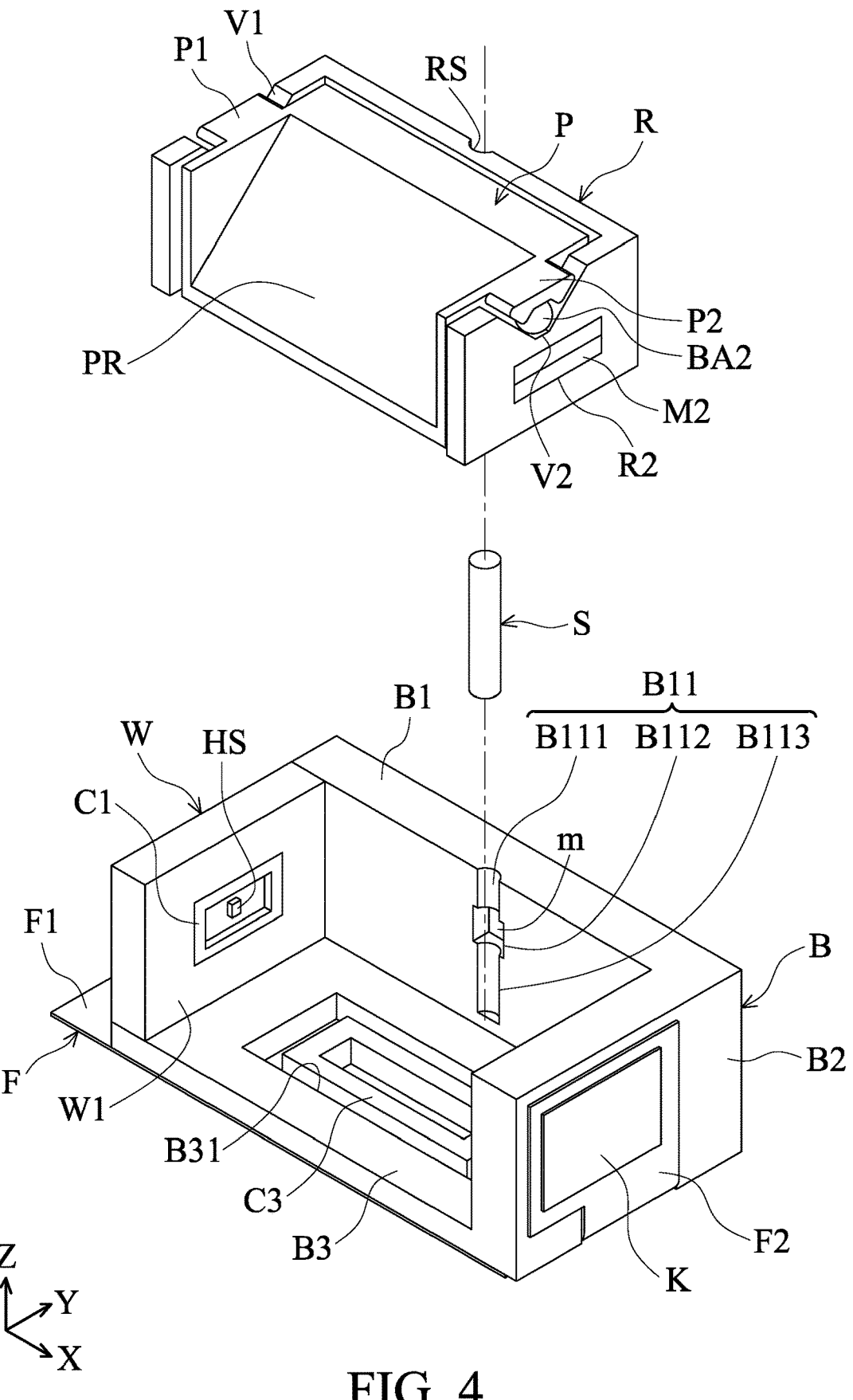
FIG. 4 is an exploded view showing the base B and the movable part R pivotally connected to each other via the hinge S.
Figure 5:
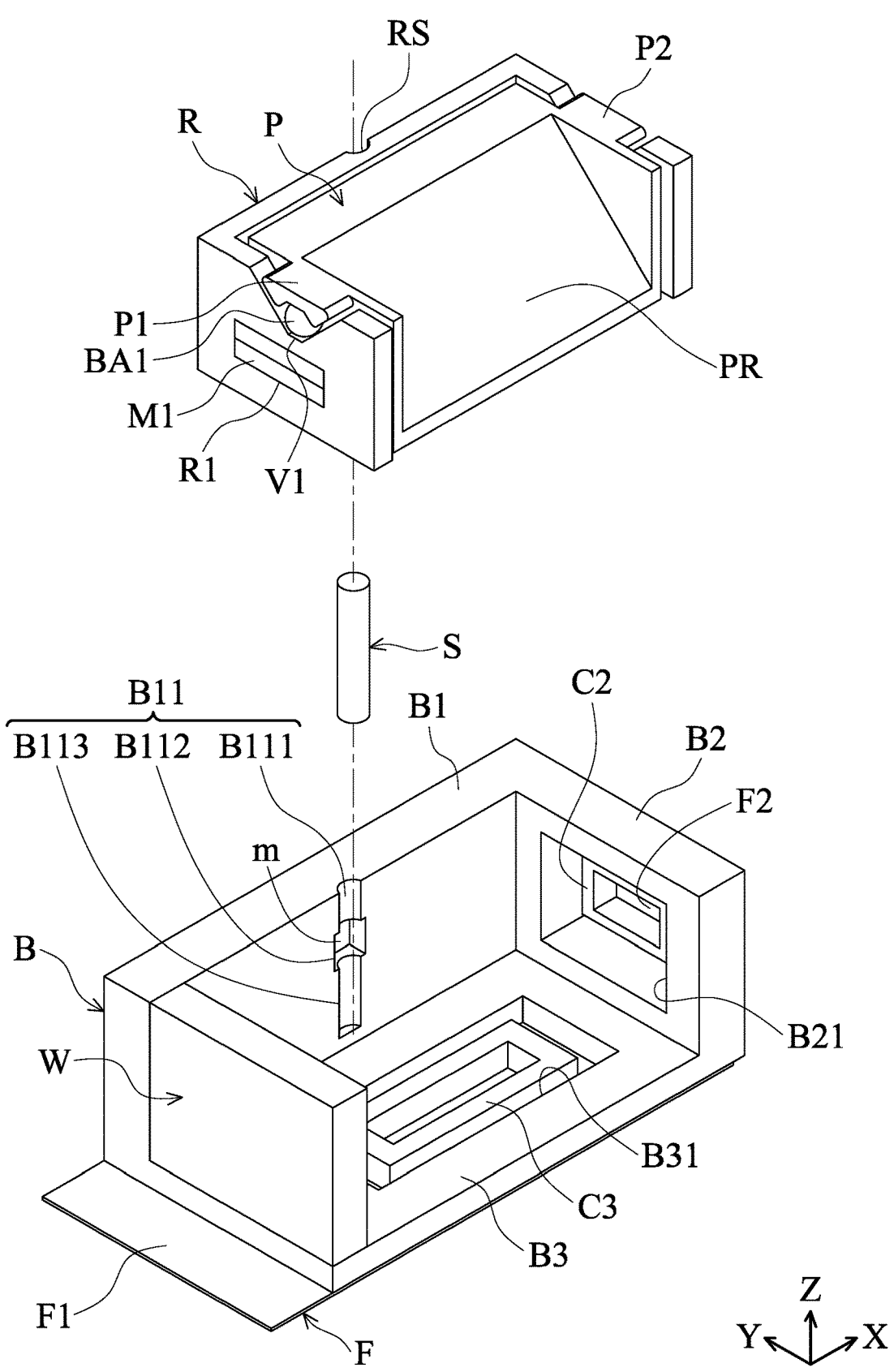
FIG. 5 is another exploded view showing the base B and the movable part R pivotally connected to each other via the hinge S.
Figure 6:
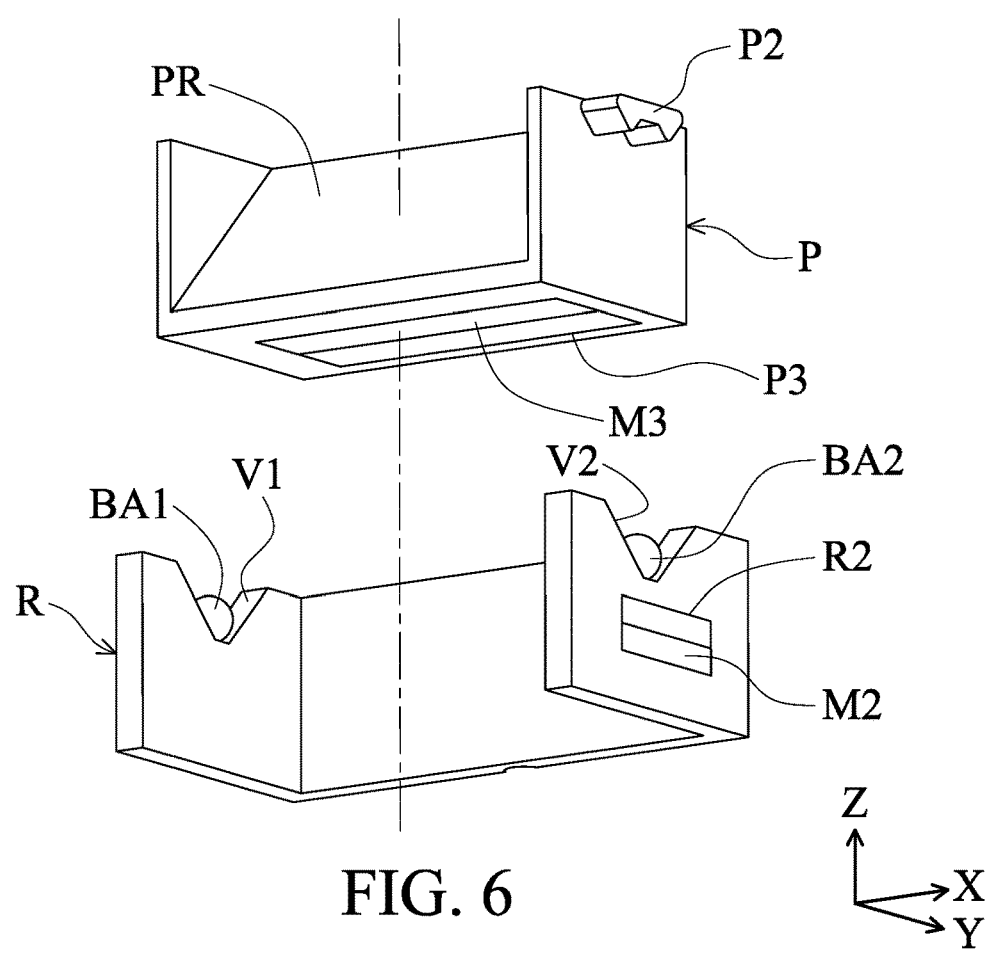
FIG. 6 is an exploded view showing the rotary member P and the movable part R pivotally connected to each other via the balls BA1 and BA2.
Figure 7:
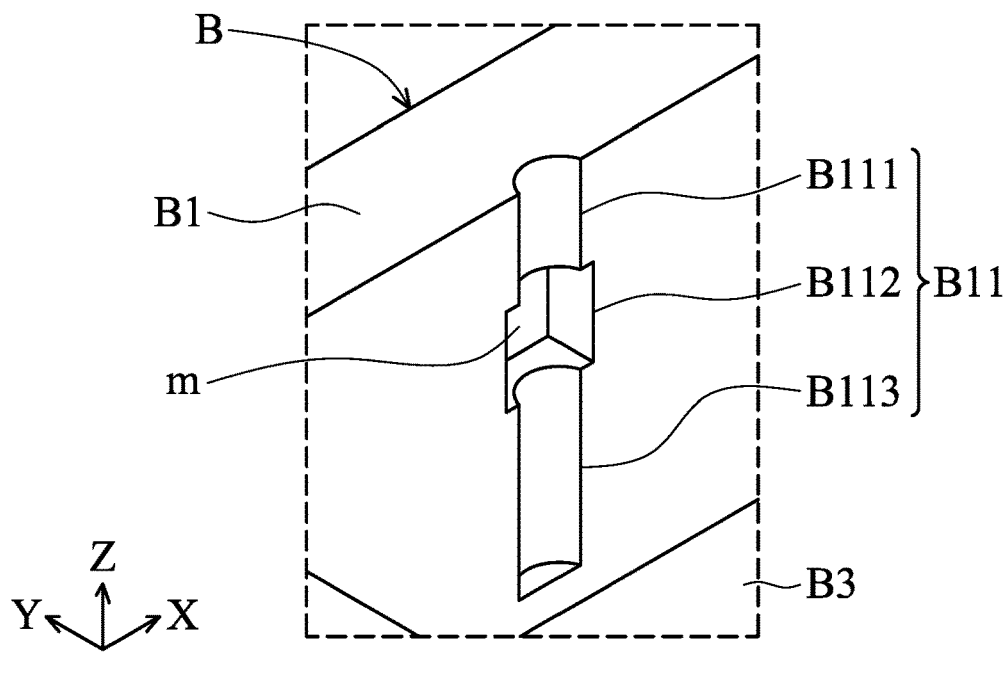
FIG. 7 is an enlarged view of the slot B11 of the base B.

FIG. 1 shows an exploded view of a driving mechanism 100 in accordance with an embodiment of the invention. FIG. 2 shows a perspective diagram of the driving mechanism 100 in FIG. 1 with the housing H removed therefrom. FIG. 3 shows another perspective diagram of the driving mechanism 100 in FIG. 1 with the housing H removed therefrom. FIG. 4 is an exploded view showing the base B and the movable part R pivotally connected to each other via the hinge S. FIG. 5 is another exploded view showing the base B and the movable part R pivotally connected to each other via the hinge S. FIG. 6 is an exploded view showing the rotary member P and the movable part R pivotally connected to each other via the balls BA1 and BA2. FIG. 7 is an enlarged view of the slot B11 of the base B.

Referring to FIGS. 1-7, the driving mechanism 100 in this embodiment is a Voice Coil Motor (VCM) which may be disposed in a cell phone or other portable electronic device for moving an optical element (e.g. the prism N shown in FIGS. 2 and 3) in a periscope lens module, thereby achieving the function of Optical Image Stabilization (OIS).

The driving mechanism 100 primarily comprises a hollow housing H, a plastic base B, a circuit assembly F, a movable part R, a plate member W, a hinge S, a first magnetic element M1, a second magnetic element M2, a third magnetic element M3, a first driving element C1, a second driving element C2, a third driving element C3, a magnet m, a sensor HS, and two balls BA1d BA2.

The hinge S is configured to pivotally connect the base B to the movable part R. The balls BA1 and BA2 are configured to pivotally connect the rotary member P to the movable part R. In this embodiment, the hinge S is located between the two balls BA1 and BA2 along the X axis.

The circuit assembly F may comprise a flexible circuit board that has a first segment F1 and a second segment F2. The second segment F2 is foldable relative to the first segment F1, and a magnetic permeable element K is disposed on the outer surface of the second segment F2, as shown in FIGS. 1, 2 and 4.

It should be noted that a slot B11 is formed on the first wall B1 of the base B, and the magnet m is received in the slot B11 to magnetically attract the hinge S. Additionally, a recess is formed on the inner surface W1 of the plate member W for receiving the first driving element C1 and the sensor HS.

The second driving element C2 is disposed on the second segment F2 of the circuit assembly F and received in the opening B21 on the second wall B2 of the base B. The third driving element C3 is disposed on the first segment F1 of the circuit assembly F and received in the opening B31 on the bottom portion B3 of the base B.

Here, the first wall B1, the second wall B2, and the bottom portion B3 are perpendicular to each other. The first and second segments F1 and F2 of the circuit assembly F are mounted on the bottom portion B3 and the second wall B2 of the base B. The plate member W is connected to the bottom portion B3 and the first wall B1 of the base B. The rotary member P and the movable part R are accommodated in the space between the plate member W and the second wall B2 of the base B after assembly.

The first, second, and third driving elements C1, C2, and C3 may be coils, and the first, second, and third magnetic elements M1, M2, and M3 may be permanent magnets. The first and second magnetic elements M1, M2 are disposed in the cavities R1, R2 on opposite sides of the movable part R, and they respectively face the first and second driving elements C1, C2. The third magnetic element M3 is disposed in the cavity R3 on the bottom side of the movable part R (FIG. 6) and faces the third driving element C3.

In this embodiment, the base B and the plate member W form a fixed part of the driving mechanism 100. The first, second, third driving elements C1, C2, C3 and the first, second, third magnetic elements M1, M2, M3 constitute a driving assembly of the driving mechanism 100.

An electromagnetic force can be generated by the first and second coils C1, C2 and the first and second magnetic elements M1, M2 to rotate the movable part R relative to the fixed part (the housing H and the base B) around the first axis A1 (FIGS. 2 and 3). Moreover, the third coil C3 and the third magnetic element M3 can generate an electromagnetic force to rotate the rotary member P relative to the movable part R around the second axis A2 (FIGS. 2 and 3).

When viewed along the first axis A1 or the second axis A2, the rotary member P and the hinge S do not overlap.

In some embodiments, the prism N of the periscope lens module (FIGS. 2 and 3) may be disposed on the reflecting surface PR of the rotary member P. Light L1 can enter the prism N in a first direction (−Z direction), and it is then reflected by the reflecting surface PR and leaves the prism N in a second direction (−Y direction). With the configuration as described above, the function of Optical Image Stabilization (OIS) can be achieved by the driving assembly promptly adjusting the angle of the prism N.

For example, one side of the hinge S may be affixed in the hole RS of the movable part R, as shown in FIGS. 4 and 5, and the other side of the hinge S may be rotatably received in the slot B11 of the base B. Moreover, the ball BA1 (first ball) is connected between the sleeve portion P1 (first sleeve portion) of the rotary member P and the V-shaped recess V1 (first recess) of the movable part R. Similarly, the ball BA2 (second ball) is connected between the sleeve portion P2 (second sleeve portion) of the rotary member P and the V-shaped recess V2 (second recess) of the movable part R.

Here, the sleeve portion P1 protrudes in the −X direction (first direction), and the sleeve portion P2 protrudes in the X direction (second direction). The recesses V1 and V2 are recessed in the −Z direction (third direction). The first and second direction are substantially parallel to the second axis A2, and the third direction is substantially parallel to the first axis A1.

Hence, when a current signal is applied to the coils C1, C2, and C3, the movable part R can be driven to rotate relative to the fixed part (the housing H and the base B) around the first axis A1 (FIGS. 2 and 3) via the hinge S. Moreover, the rotary member P can be driven to rotate relative to the movable part R around the second axis A2 via the balls BA1 and BA2, thereby promptly adjusting the angle of the prism N.

It can be seen in FIGS. 4, 5, and 7 that the longitudinal slot B11 of the base B has a first section B111, a second section B112, and a third section B113. The second section B112 is connected between the first and third sections B111 and B113, and the width of the second section B112 is longer than the width of the first and third sections B111 and B113. Therefore, the flatness of the inner surface of the first wall B1 can be efficiently improved, so as to increase the positioning accuracy and reliability of the driving mechanism 100.

It should be noted that the magnet m is received in the second section B112 of the slot B11. Thus, the hinge S can be magnetically attracted by the magnet m, whereby the hinge S can be prevented from separation from the slot B11.

In some embodiments, the magnet m may be disposed on the other side of the base B that is opposite to the slot B11, thereby magnetically attracting and restricting the hinge S in the slot B11.

Figure 8:
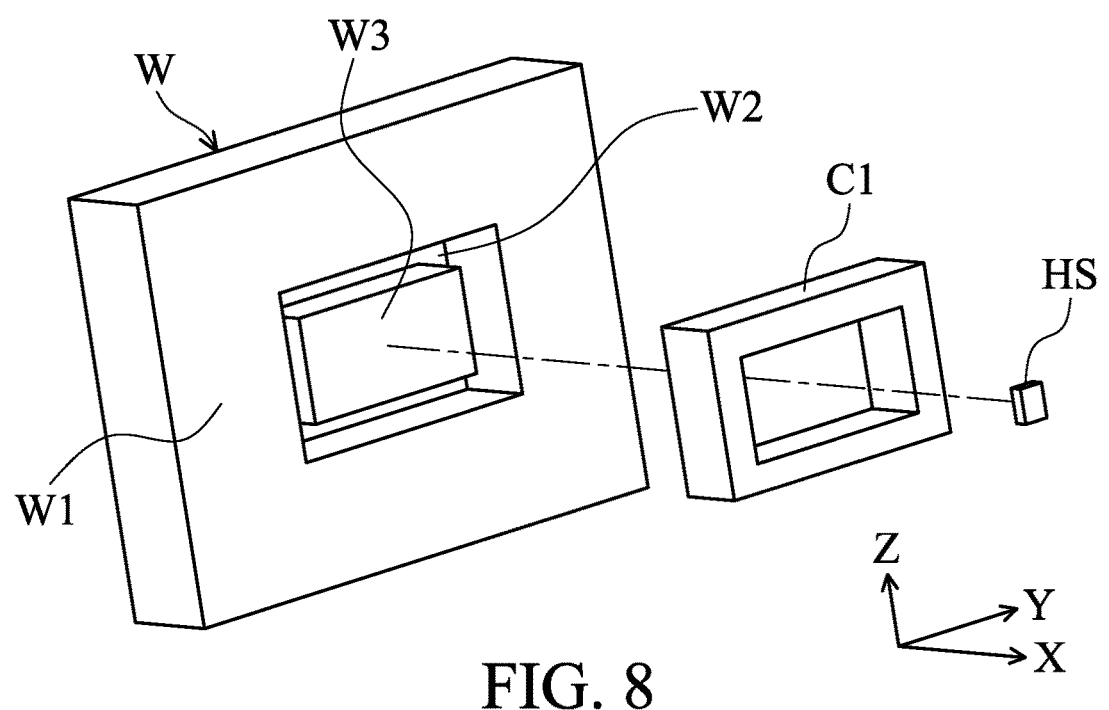
FIG. 8 shows an exploded view of the plate member W, the first driving element C1, and the sensor HS.
Figure 9:
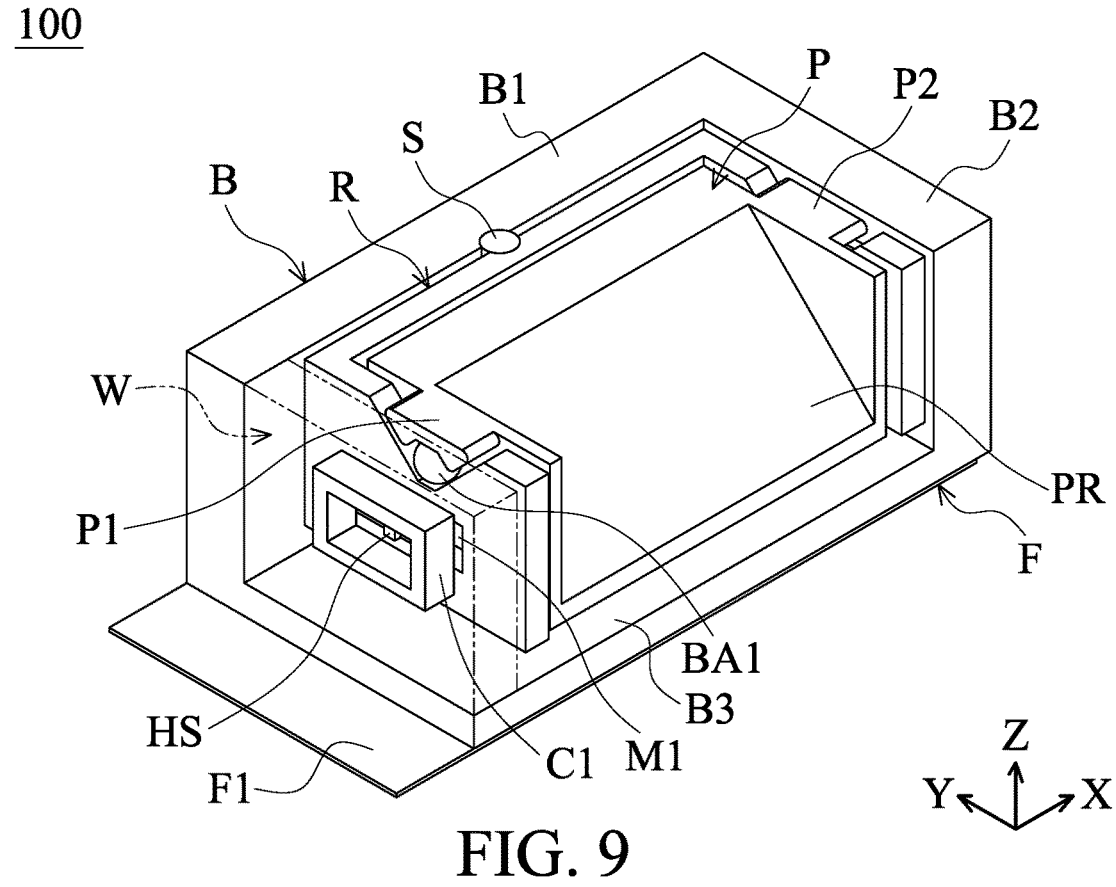
FIG. 9 is a perspective diagram showing the first driving element C1 and the sensor HS located close to the first magnetic element M1.
Figure 10:
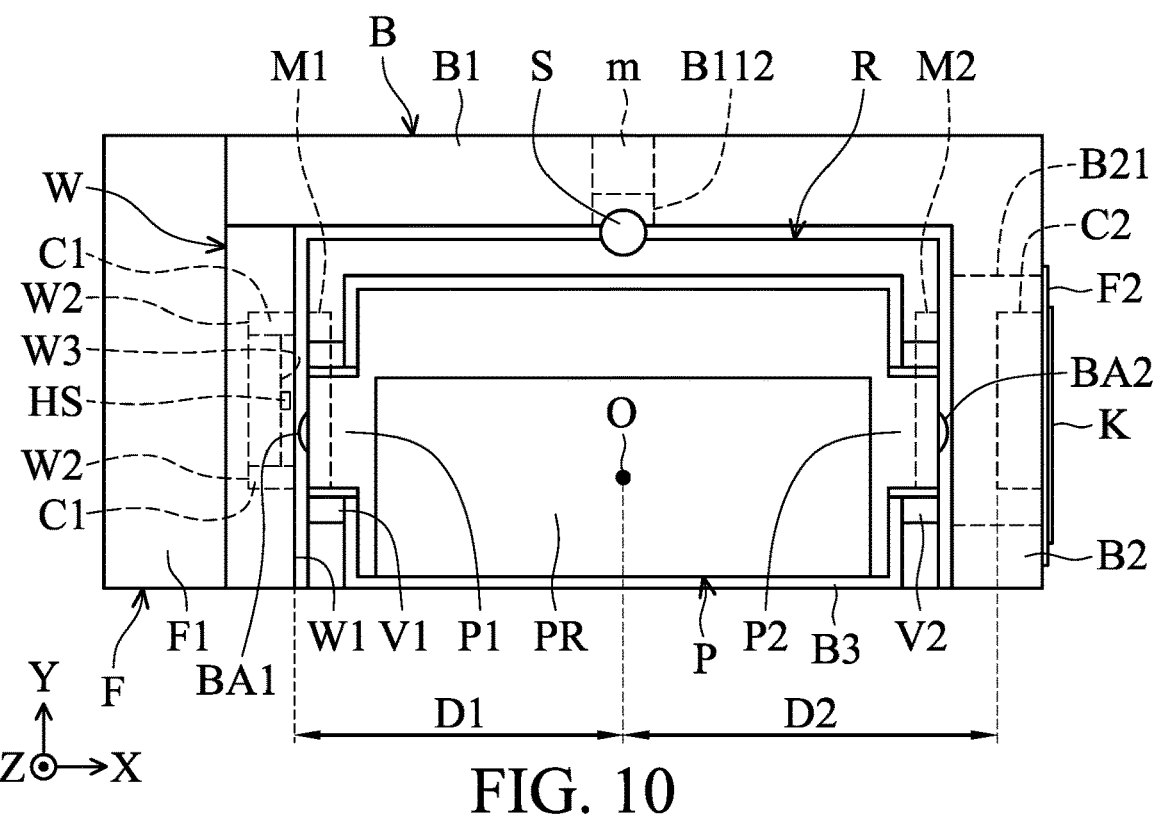
FIG. 10 is a top view of the driving mechanism 100 with the housing H removed therefrom.
Figure 11:
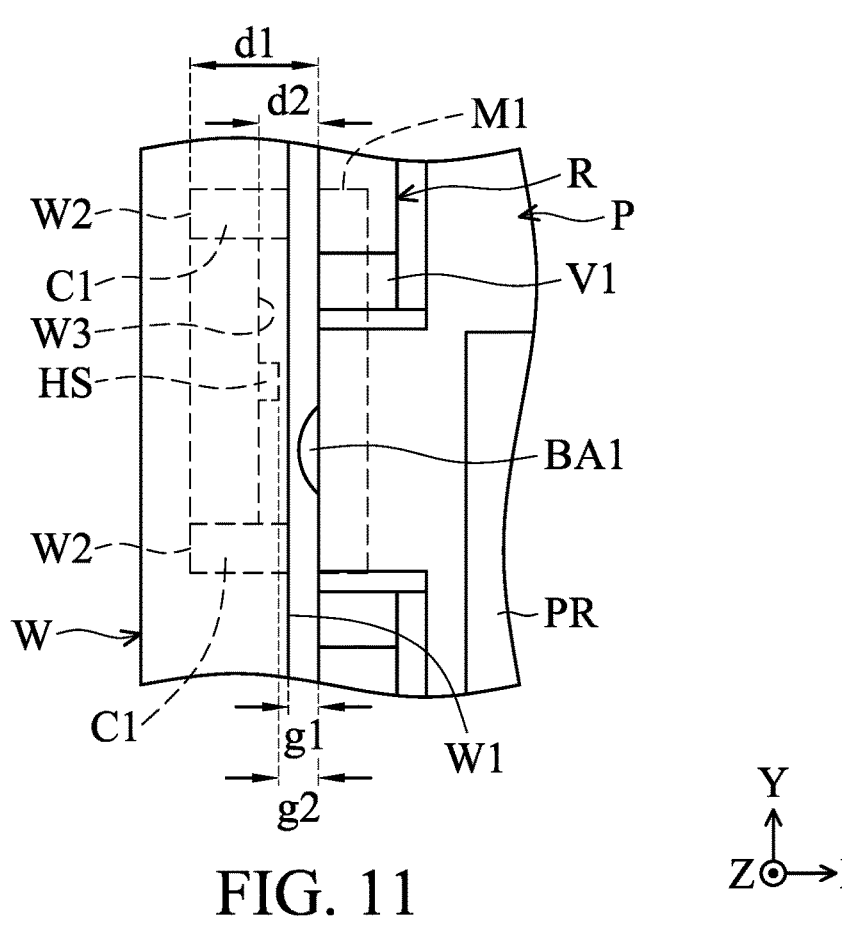
FIG. 11 is an enlarged view of the first magnetic element M1, the first driving element C1, and the sensor HS in FIG. 10.

FIG. 8 shows an exploded view of the plate member W, the first driving element C1, and the sensor HS. FIG. 9 is a perspective diagram showing the first driving element C1 and the sensor HS located close to the first magnetic element M1. FIG. 10 is a top view of the driving mechanism 100 with the housing H removed therefrom. FIG. 11 is an enlarged view of the first magnetic element M1, the first driving element C1, and the sensor HS in FIG. 10.

Referring to FIGS. 8-11, an annular cavity W2 and a protrusion W3 are formed on the inner surface W1 of the plate member W, wherein the annular cavity W2 surrounds the protrusion W3. The first driving element C1 is disposed on the bottom surface of the annular cavity W2, and the sensor HS is disposed on the top surface of the protrusion W3. Here, the first driving element C1 surrounds the sensor HS and faces the first magnetic element M1. Moreover, the first driving element C1 and the sensor HS are electrically connected to the circuit assembly F via conductive wires (not shown).

For example, the sensor HS may be a Hall effect sensor, MR sensor, or Fluxgate sensor or other magnetic field sensors to detect the position variation of the first magnetic element M1, so that the displacement of the movable part R relative to the fixed part (the housing H and the base B) can be determined.

When viewed in a reference direction parallel to the Y axis, the first driving element C1 and the sensor HS at least partially overlap, and they do not protrude from the inner surface W of the plate member W. Hence, the sensor HS can be efficiently protected from impact by other components.

As shown in FIG. 10, the first and second driving elements C1 and C2 are disposed on opposite sides of the movable part R. A first distance D1 is formed between the first driving element C1 and the central axis O of the prism N (or the reflecting surface PR), and a second distance D2 is formed between the second driving element C2 and the central axis O of the prism N (or the reflecting surface PR). Specifically, the first distance D1 is shorter than the second distance D2.

Moreover, the distance between the first driving element C1 and the first magnetic element M1 is shorter than the distance between the second driving element C2 and the second magnetic element M2. The second section B112 of the slot B11 extends through the first wall B1 of the base B along the Y axis, and the magnet m is disposed in the second section B112 (FIG. 10).

It can be clearly seen in FIG. 11 that the top surface of the protrusion W3 is closer to the first magnetic element M1 than the bottom surface of the annular cavity W2. Hence, the distance between the sensor HS and the first magnetic element M1 can be reduced to efficiently increase the accuracy of the sensor HS and the performance of the driving mechanism 100.

In this embodiment, the bottom surface of the cavity W2 and the first magnetic element M1 have a distance d1 along the X axis, and the top surface of the protrusion W3 and the first magnetic element M1 have a distance d2, wherein the distance d1 is longer than the distance d2. Here, the top surface of the protrusion W3 and the bottom surface of the cavity W2 are both parallel to the Z axis and the Y axis (reference direction) and perpendicular to the X axis. Moreover, the first driving element C1 and the first magnetic element M1 have a distance g1, and the sensor HS and the first magnetic element M1 have a distance g2, wherein the distance g1 is shorter than the distance g2.

Figure 12:
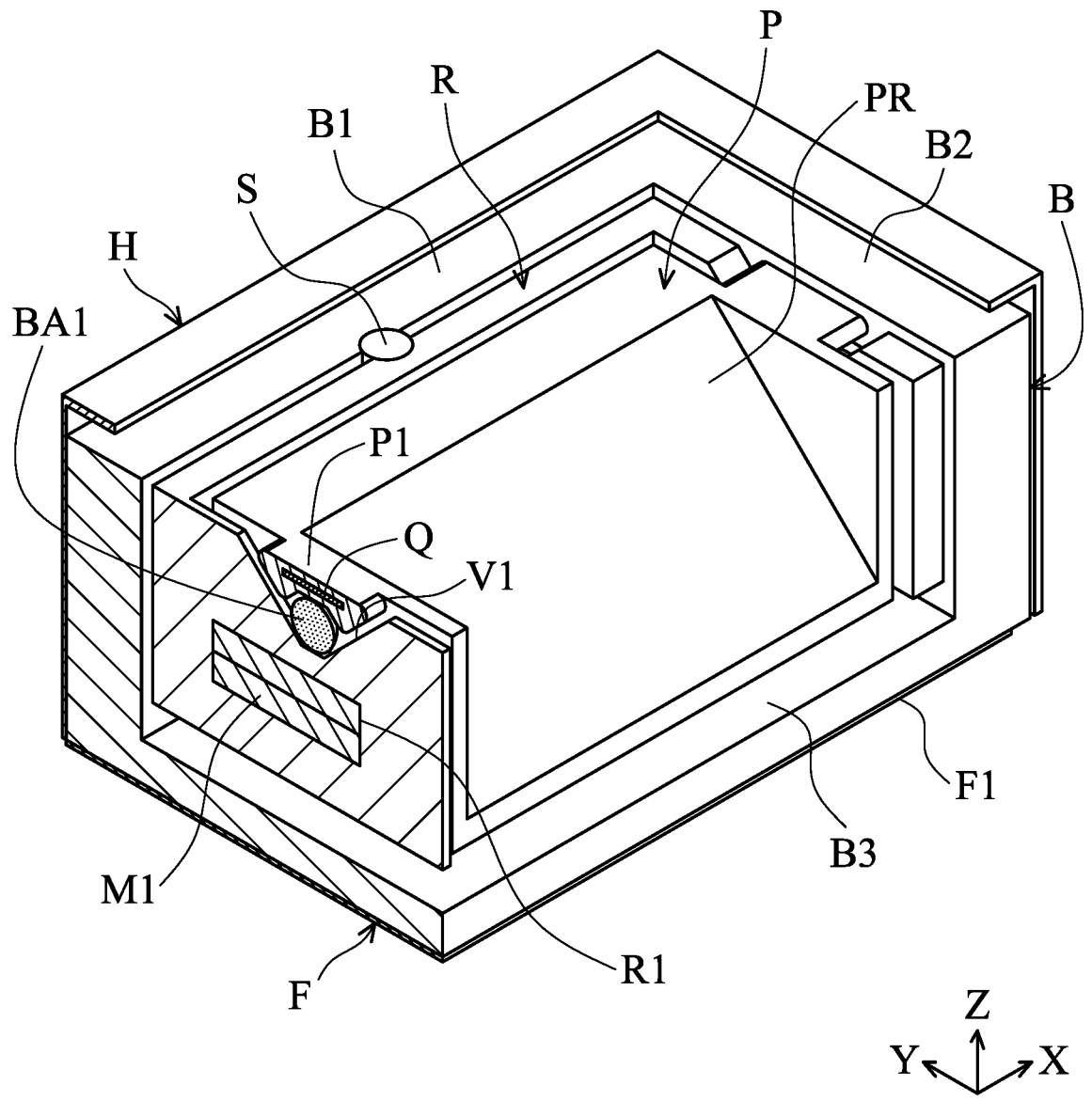
FIG. 12 is a cross-sectional view showing a magnetic permeable element Q disposed in the sleeve portion P1 of the rotary member P.

FIG. 12 is a cross-sectional view showing a magnetic permeable element Q disposed in the sleeve portion P1 of the rotary member P.

Referring to FIG. 12, a magnetic permeable element Q is embedded in the sleeve portion P1 of the rotary member P by insert molding. After assembly of the driving mechanism 100, the ball BA1 can be stably held between the sleeve portion P1 of the rotary member P and the V-shaped recess V1 of the movable part R by magnetic attraction between the magnetic permeable element Q and the metal ball BA1. Similarly, another magnetic permeable element (not shown) may be disposed in the sleeve portion P2 of the rotary member P, whereby the ball BA2 can be stably held between the sleeve portion P2 of the rotary member P and the V-shaped recess V2 of the movable part R by magnetic attraction between the magnetic permeable element and the metal ball BA2.

With the configuration as described above, sensing accuracy of the sensor HS and performance of the driving mechanism 100 can be efficiently increased. Additionally, miniaturization of the driving mechanism 100 can also be achieved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for moving an optical element, comprising:
   a fixed part;
   a movable part, movably connected to the fixed part for holding the optical element;
   a driving assembly, configured for moving the movable part relative to the fixed part, wherein the driving assembly includes a first driving element that drives the movable part to rotate relative to the fixed part around a first axis; and
   a sensor, wherein the sensor and the first driving element are disposed on the fixed part, and when viewed in a reference direction, the first driving element and the sensor at least partially overlap,
   wherein the fixed part includes a base and a plate member connected to the base, and a cavity and a protrusion are formed on an inner surface of the plate member, wherein the first driving element is disposed on a bottom surface of the cavity, and the sensor is disposed on a top surface of the protrusion, wherein the bottom surface and the top surface are parallel to the reference direction, and the first driving element and the sensor do not protrude from the inner surface of the plate member.

2. The driving mechanism as claimed in claim 1, wherein the driving assembly further includes a first magnetic element disposed on the movable part, and the sensor is a magnetic field sensor to detect the position variation of the first magnetic element.

3. The driving mechanism as claimed in claim 2, wherein the first driving element comprises a coil surrounding the sensor.

4. The driving mechanism as claimed in claim 1, wherein the driving assembly further includes a first magnetic element disposed on the movable part, and the sensor is a magnetic field sensor to detect the position variation of the first magnetic element and the movable part.

5. The driving mechanism as claimed in claim 4, wherein the distance between the bottom surface of the cavity and the first magnetic element is longer than the distance between the top surface of the protrusion and the first magnetic element.

6. The driving mechanism as claimed in claim 4, wherein the distance between the first driving element and the first magnetic element is shorter than the distance between the sensor and the first magnetic element.

7. The driving mechanism as claimed in claim 4, wherein the first driving element comprises a coil, and the cavity surrounds the protrusion.

8. A driving mechanism for moving an optical element, comprising:

a fixed part;

a movable part, movably connected to the fixed part for holding the optical element;

a driving assembly, configured for moving the movable part relative to the fixed part, wherein the driving assembly includes a first driving element that drives the movable part to rotate relative to the fixed part around a first axis; and a sensor, wherein the sensor and the first driving element are disposed on the fixed part, and when viewed in a reference direction, the first driving element and the sensor at least partially overlap, wherein the driving assembly further includes a second driving element disposed on the fixed part for driving the movable part to rotate relative to the fixed part around the first axis, and the first and second driving elements are located on opposite sides of the movable part, wherein the first driving element and a central axis of the optical element have a first distance, and the second driving element and the central axis of the optical element have a second distance, wherein the first distance is shorter than the second distance.

9. The driving mechanism as claimed in claim 8, further comprising a rotary member and a ball pivotally connecting the rotary member to the movable part, wherein the optical element is disposed on the rotary member, and the rotary member is rotatable relative to the movable part around a second axis via the ball.

10. The driving mechanism as claimed in claim 9, wherein the reference direction is perpendicular to the first and second axes.

11. A driving mechanism for moving an optical element, comprising:

a fixed part;

a movable part, movably connected to the fixed part for holding the optical element;

a driving assembly, configured for moving the movable part relative to the fixed part;

a hinge, wherein the movable part is pivotally connected to the fixed part via the hinge;

a rotary member, wherein the optical element is disposed on the rotary member; and a ball, wherein the rotary member is pivotally connected to the movable part via the ball.

12. The driving mechanism as claimed in claim 11, wherein the movable part is rotatable relative to the fixed part around a first axis, the fixed part forms a slot extending along the first axis, and the hinge is received in the slot, wherein the slot has a first section, a second section, and a third section, the second section is connected between the first and third sections, and the width of the second section is longer than the width of the first and third sections.

13. The driving mechanism as claimed in claim 12, further comprising a magnet disposed in the slot.

14. The driving mechanism as claimed in claim 11, further comprising two balls disposed on opposite sides of the movable part, wherein the balls are connected between the rotary member and the movable part, and the hinge is located between the balls.

15. The driving mechanism as claimed in claim 11, further comprising a magnetic permeable element disposed on the movable part, wherein the driving assembly further includes a first magnetic element disposed on the movable part, and the ball is located between the magnetic permeable element and the first magnetic element.

16. The driving mechanism as claimed in claim 11, wherein the rotary member is rotatable relative to the movable part around a second axis, and when viewed along the first axis or the second axis, the rotary member and the hinge do not overlap.

17. The driving mechanism as claimed in claim 16, further comprising a first ball and a second ball, wherein the rotary member has a first sleeve portion and a second sleeve portion, and the movable part forms a first recess and a second recess, wherein the first and second sleeve portions respectively extend in a first direction and a second direction, the first and second recesses are recessed in a third direction that is parallel to the first axis, the first ball is received in the first recess and connected to the first sleeve portion, and the second ball is received in the second recess and connected to the second sleeve portion, wherein the first and second directions are opposite to each other and parallel to the second axis.

18. A driving mechanism for moving an optical element, comprising:

a fixed part;

a movable part, movably connected to the fixed part for holding the optical element; and a driving assembly, configured for moving the movable part relative to the fixed part, wherein the fixed part includes a base and a plate member connected to the base, and the base has a bottom portion, a first wall, and a second wall perpendicular to each other, wherein the plate member is connected to the bottom portion and the first wall, and the movable part is located between the plate member and the second wall.

19. The driving mechanism as claimed in claim 18, wherein the driving assembly includes a first magnetic element, a second magnetic element, a first driving element, and a second driving element for driving the movable part to rotate relative to the fixed part around a first axis, wherein the first driving element is received in a cavity of the plate member, and the second driving element is received in an opening of the second wall, wherein the first and second magnetic elements are disposed on opposite sides of the movable part and located corresponding to the first and second driving elements.

20. The driving mechanism as claimed in claim 19, wherein the distance between the first driving element and the first magnetic element is shorter than the distance between the second driving element and the second magnetic element.

* * * * *